(12) United States Patent
Sagara et al.

(10) Patent No.: US 9,637,172 B2
(45) Date of Patent: May 2, 2017

(54) VEHICLE BODY STRUCTURE FOR AUTOMOBILE

(71) Applicant: NISSAN MOTOR CO., LTD., Yokohama-shi, Kanagawa (JP)

(72) Inventors: Kenji Sagara, Kanagawa (JP); Takeo Ehara, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/035,504

(22) PCT Filed: Oct. 20, 2014

(86) PCT No.: PCT/JP2014/077786
§ 371 (c)(1),
(2) Date: May 10, 2016

(87) PCT Pub. No.: WO2015/072288
PCT Pub. Date: May 21, 2015

(65) Prior Publication Data
US 2016/0288837 A1    Oct. 6, 2016

(30) Foreign Application Priority Data
Nov. 12, 2013  (JP) .................................. 2013-233633

(51) Int. Cl.
*B62D 21/02*  (2006.01)
*B62D 21/15*  (2006.01)
(Continued)

(52) U.S. Cl.
CPC .............. *B62D 21/155* (2013.01); *B60K 1/04* (2013.01); *B62D 21/11* (2013.01); *B62D 25/087* (2013.01);
(Continued)

(58) Field of Classification Search
CPC ...... B62D 21/155; B62D 21/15; B62D 21/11; B62D 21/152; B62D 21/02; B62D 21/00;
(Continued)

(56) References Cited

U.S. PATENT DOCUMENTS 6,109,654 A * 8/2000 Yamamoto ............. B62D 21/11
180/299
7,144,039 B2 * 12/2006 Kawasaki ................ B60K 1/04
180/232

FOREIGN PATENT DOCUMENTS

JP        09109919 A  *  4/1997
JP      2004106808 A  *  4/2004
(Continued)

*Primary Examiner* — Keith Frisby
(74) *Attorney, Agent, or Firm* — Drinker Biddle & Reath LLP

(57) ABSTRACT

Upon a rear-end collision of a vehicle, an arm section(s) of a cross member of a rear suspension member on the rear side of the vehicle, which is(are) positioned in a low-strength region in a vehicle-body strength distribution, undergoes crush deformation together with a corresponding rear side member(s). Deformation of the part of the rear suspension member other than the arm sections, which is positioned in a high-strength region in the vehicle-body strength distribution, is suppressed, so that a high voltage component mounted in the high-strength region is protected.

6 Claims, 4 Drawing Sheets

(51) Int. Cl.
    *B62D 25/08*     (2006.01)
    *B62D 21/11*     (2006.01)
    *B60K 7/00*     (2006.01)
    *B60K 1/04*     (2006.01)

(52) U.S. Cl.
    CPC .. *B60G 2206/604* (2013.01); *B60G 2206/605* (2013.01); *B60K 7/0007* (2013.01); *B60K 2001/0438* (2013.01); *B60K 2007/0038* (2013.01); *B60K 2007/0092* (2013.01)

(58) Field of Classification Search
    CPC ................ B60K 1/04; B60G 2206/604; B60G 2206/605; B60G 2206/60; B60G 2206/0114; B60G 2204/15
    USPC .......... 280/124.109, 784; 296/187.09, 187.1, 296/187.11, 204, 203.04; 180/299
    See application file for complete search history.

(56) References Cited

FOREIGN PATENT DOCUMENTS

| | | | |
|---|---|---|---|
| JP | 2005-132348 A | | 5/2005 |
| JP | 2005186727 A | * | 7/2005 |
| JP | 2006-088871 A | | 4/2006 |
| JP | 2010-137806 A | | 6/2010 |
| JP | 2013-75535 A | | 4/2013 |
| JP | 2013-169812 A | | 9/2013 |
| JP | 2014069654 A | * | 4/2014 |
| WO | WO 2012/017935 A1 | | 2/2012 |

* cited by examiner

VEHICLE BODY STRUCTURE FOR AUTOMOBILE

TECHNICAL FIELD

The present invention relates to a vehicle body structure for an automobile such as an electric vehicle or a hybrid electric vehicle with a high voltage component mounted on a suspension member.

BACKGROUND ART

Patent Literature 1 discloses a vehicle body structure in which an electric motor is mounted on a suspension member arranged on the lower side of the front of a vehicle body and, upon a front-end collision of the vehicle, the suspension member is bent downward to suppress rearward movement of the electric motor.

CITATION LIST

Patent Literature

Patent Literature 1: Japanese Patent Application Publication No. 2006-88871

SUMMARY OF INVENTION

Technical Problem

In the vehicle body structure disclosed in Patent Literature 1, since the suspension member is bent downward upon input of a load into the vehicle, there is a possibility that the deformation may reach the part of the suspension member where the electric motor is mounted. In the case particularly of an offset collision of the vehicle, the inputted load is applied to an end portion of the suspension member on one side, thereby making the bend of the suspension member uneven between the left and right sides; hence, there is a higher possibility that the deformation may reach the part of the suspension member where the electric motor is mounted.

Thus, an object of the present invention is to provide a vehicle body structure for an automobile capable of protecting a high voltage component and bringing about an efficient collision-energy absorption effect by causing proper crush deformation of the suspension member taking into account that the high voltage component is mounted.

Solution to Problem

A vehicle body structure for an automobile according to the present invention includes a suspension member arranged horizontally on a lower side of a front or a rear of a vehicle body and supporting a wheel.

The suspension member is formed in a rectangular frame shape in a plan view by including a pair of left and right side members extending in a vehicle front-rear direction and a pair of front and rear cross members joining the pair of side members to each other. At least the cross member on an end side of the vehicle body includes arm sections extending obliquely outward in a vehicle width direction toward the end side of the vehicle body from portions of the cross member on the end side of the vehicle body linked to the side members, and fastened at end portions thereof to vehicle-body-side members.

Moreover, strength of the arm sections is set lower than strength of the remaining part of the suspension member, and a vehicle-body strength distribution in an area where the suspension member is arranged is set such that a low-strength region and a high-strength region sequentially appear from the end side of the vehicle body. A high voltage component is mounted on the suspension member on a center side of the vehicle body relative to a base portion of the arm section in an extending direction thereof and in the high-strength region in the vehicle-body strength distribution.

DESCRIPTION OF EMBODIMENTS

An embodiment of the present invention will be described below in detail with the drawings. Note that an arrow FR in each drawing indicates the front side of a vehicle.

Figure 1:
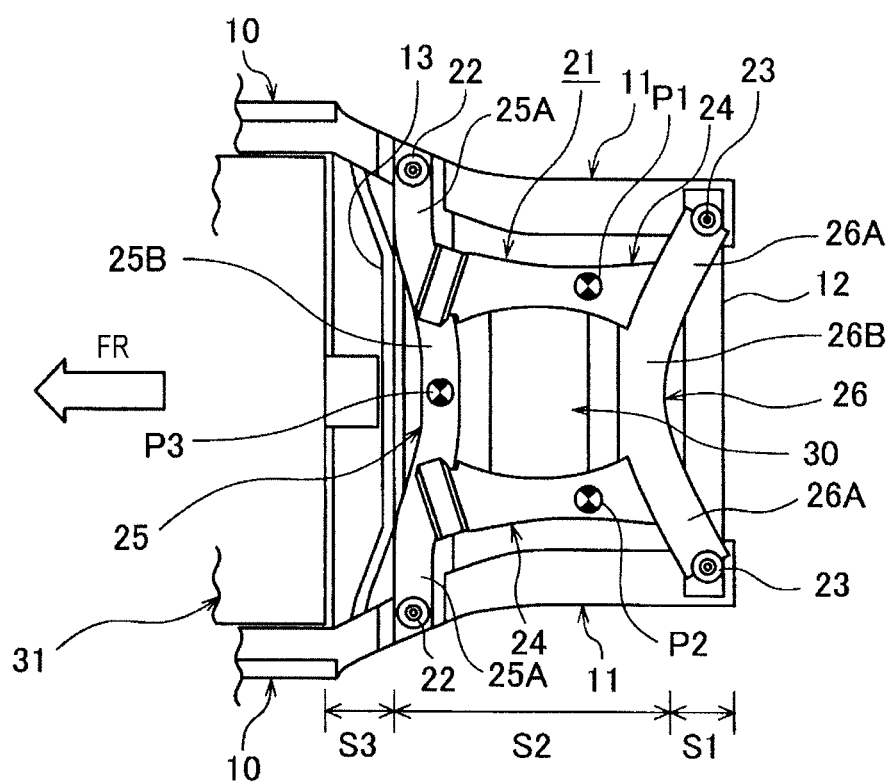
FIG. 1 is a bottom view showing how a rear suspension member is arranged in an embodiment of the present invention.
Figure 2:
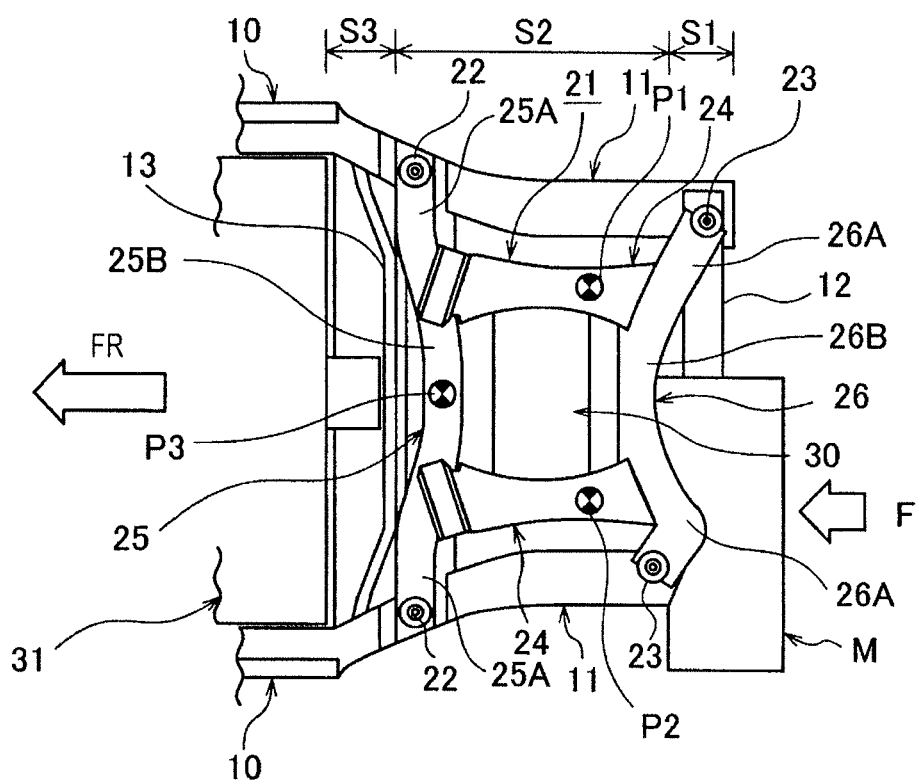
FIG. 2 is a bottom view showing how the rear suspension member is deformed upon a rear-end offset collision of the vehicle in the embodiment shown in FIG. 1.

A vehicle body structure in an embodiment shown in FIGS. 1 and 2 represents the present invention applied to the rear of a vehicle body, and shows how rear side members 11 as vehicle-body-side members and a rear suspension member 21 as a suspension member are arranged when seen from below.

The rear side members 11 constitute front-rear-direction skeletal members of the rear of the vehicle body and extend in the vehicle front-rear direction at opposite side sections of a rear floor not shown in the vehicle width direction.

The pair of left and right rear side members 11 are joined to each other by a rear-end cross member 12 and a rear-seat cross member 13 which extend in the vehicle width direction and constitute vehicle-width-direction skeletal members.

Further, the rear suspension member 21, which is configured to support rear wheels 1 to be described later (see FIGS. 4 and 5), is arranged to connect between this pair of left and right rear side members 11, 11. This rear suspension member 21 is joined to each rear side member 11.

Figure 3:
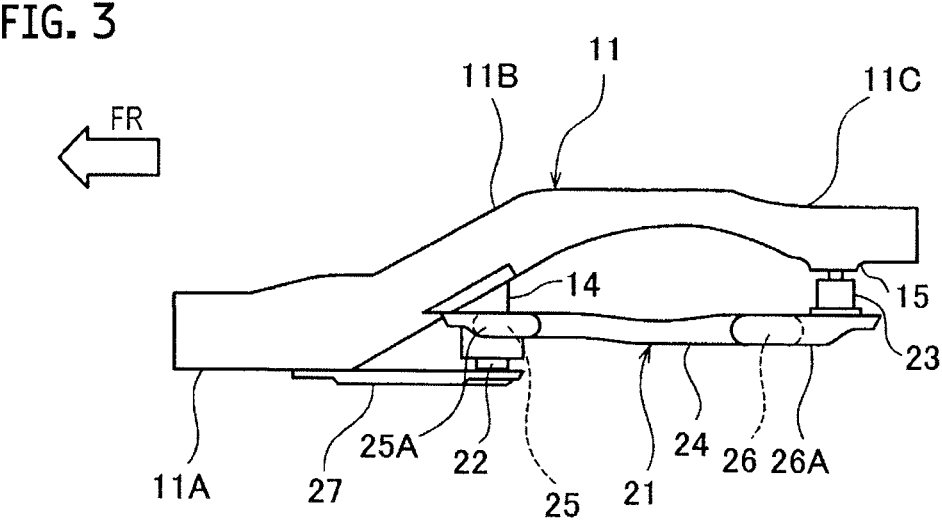
FIG. 3 is a side view showing how rear side members and the rear suspension member are arranged in the embodiment shown in FIG. 1.

As shown in FIG. 3, each rear side member 11 includes: a member base section 11A connected to a side sill 10 (see FIGS. 1 and 2) serving as one of floor skeletal members of a front floor; a kick-up section 11B rising obliquely upward from a rear end portion of this member base section 11A; and a member body section 11C extending horizontally from a rear end portion of this kick-up section 11B toward the rear side of the vehicle.

Seat portions 14, 15 are formed on the lower surface of a portion of the kick-up section 11B to which the rear-seat cross member 13 is linked, and on the lower surface of a portion of the member body section 11C to which the rear-end cross member 12 is linked, respectively.

The rear suspension member 21, with its front and rear fastening portions 22, 23 fastened and fixed to the seat portions 14, 15, is arranged in parallel to the member body section 11C of each rear suspension member 21, i.e., arranged horizontally, while connecting between the kick-up section 11B and the member body section 11C.

The rear suspension member 21 is formed in a rectangular frame shape in a plan view by including a pair of left and right side members 24 extending in the vehicle front-rear direction and a pair of front and rear cross members 25, 26 joining this pair of side members 24, 24 to each other.

The pair of front and rear cross members 25, 26 include arm sections 25A, 26A extending outward in the vehicle width direction from the portions of the cross members 25, 26 linked to the side members 24, respectively. The fastening portions 22, 23 are provided on tip portions of these arm sections 25A, 26A, respectively.

A general-purpose bush-type mount member including a vibration insulator can be used as each fastening portion 22, 23.

The cross member 25 toward the front side of the vehicle including the arm sections 25A is formed in a substantially straight shape. In contrast, the cross member 26 on the rear side of the vehicle is formed in an arched shape bulging toward the front side of the vehicle in the plan view, with the arm sections 26A extending obliquely outward in the vehicle width direction toward the rear end side of the vehicle body.

The strength of the arm sections 26A of the cross member 26 on the rear side of the vehicle is set lower than the strength of the remaining part of the rear suspension member 21. The vehicle-body strength distribution in the area where the rear suspension member 21 is arranged is set such that a low-strength region S1 and a high-strength region S2 sequentially appear from the rear end side of the vehicle body.

In this embodiment, the strength of each arm section 25A of the cross member 25 toward the front side of the vehicle is set such that the strength of the entire arm section 25A from the portion of the arm section 25A linked to the side member 24 to the fastening portion 22 on the arm section 25A, which is fastened to the rear side member 11, is higher than the strength of a vehicle-width-direction middle section 25B.

The strength of these arm sections 25A, 26A can be adjusted by, for example, adjusting the plate thickness and/or closed-cross-sectional area of the plate material(s) constituting the arm sections 25A, 26A.

A high voltage component 30 such for example as an inverter is mounted on the rear suspension member 21 on the center side of the vehicle body relative to a base portion of each arm section 26A in its extending direction and in the high-strength region S2 in the vehicle-body strength distribution.

This high voltage component 30 can be fixed to the rear suspension member 21 by using, for example, general-purpose bush-type mount members each including a vibration insulator, as the fastening portions 22, 23.

This embodiment employs a three-point securing structure where points P to fix the high voltage component 30 is fixed to the rear suspension member 21 are two fixing points P1, P2 to rear sections of the pair of left and right side members 24 and one fixing point P3 to the center of the vehicle on the vehicle-width-direction middle section 25B of the cross member 25 toward the front side of the vehicle.

Meanwhile, a battery 31 as a drive power source for traction motors 32 to be described later is mounted under the front floor between the pair of left and right side sills 10, 10 in such a way as to substantially completely occupy that area in the vehicle width direction, thereby making the front floor into a rigid body structure between the pair of left and right side sills 10, 10.

For this reason, the strength of the pair of left and right side members 24 of the rear suspension member 21 and the cross member 25 of the rear suspension member 21 toward the front side of the vehicle is set higher than the strength of the vehicle body at an intermediate area situated between the area where the rear suspension member 21 is arranged and the area where battery 31 is arranged. This intermediate area is set as a low-strength region in the vehicle-body strength distribution.

As a result, the vehicle-body strength distribution from the area where the rear suspension member 21 is arranged to the intermediate area is obtained such that the low-strength region S1, the high-strength region S2, and a low-strength region S3 sequentially appear from the rear end side of the vehicle body.

Note that in FIG. 3, reference sign 27 denotes a pin stay for a reinforcing member for joining the fastening portion 22 of the rear suspension member 21 toward the front side of the vehicle and a rear end portion of the side sill 10 (the member base section 11A of the rear side member 11).

In this embodiment with the above structure, upon an offset collision in which a collision object M collides with one side of the rear end of the vehicle as shown for example in FIG. 2, the corresponding arm section 26A of the cross member 26, on the rear side of the vehicle, of the rear suspension member 21, which is positioned in the low-strength region S1 in the vehicle-body strength distribution on the rear end side of the vehicle body in the area where the rear suspension member 21 is arranged, undergoes crush deformation together with the corresponding rear side member 11, which is one vehicle-body-side member, and the corresponding one side of the rear-end cross member 12, thereby absorbing the collision energy.

This crush deformation of the rear suspension member 21 is allowed only up to the base portion of the arm section 26A in its extending direction. On the other hand, the rectangular frame shape in the plan view is maintained which is formed by the part of the rear suspension member 21 other than each arm section 26A, which is positioned in the high-strength region S2 in the vehicle-body strength distribution toward the center side of the vehicle body, i.e. the vehicle-width-direction middle section 26B of the cross member 26 on the rear side of the vehicle, the pair of left and right of side members 24, and the cross member 25 toward the front side of the vehicle.

In this way, even upon a rear-end offset collision of the vehicle, it is possible to well absorb the collision energy and also to properly protect the high voltage component 30, which is mounted on the rear suspension member 21 in the high-strength region S2 in the vehicle-body strength distribution.

Here, even upon a rear-end offset collision of the vehicle, the part of the rear suspension member 21 other than each arm section 26A is maintained in the rectangular frame shape in the plan view, as mentioned above; thus, this rear suspension member 21 functions as a load-transferring beam member and thereby spreads the collision load substantially evenly between the left and right sides and transfers it to the front of the vehicle body.

Also, in this embodiment, the strength of the pair of left and right of side members 24 of the rear suspension member 21 and the cross member 25 of the rear suspension member 21 toward the front side of the vehicle is set higher than the strength of the vehicle body at the intermediate area, which is situated between the area where the rear suspension member 21 is arranged and the area where the battery 31 under the front floor is arranged. The vehicle-body strength distribution from the area where the rear suspension member 21 is arranged to the intermediate area is set such that the low-strength region S1, the high-strength region S2, and the low-strength region S3 sequentially appear from the rear end side of the vehicle body.

In this way, a collision load F which is transferred to the front of the vehicle body through the rear suspension member 21 maintaining the rectangular frame shape in the plan view as mentioned above, causes crush deformation also at the low-strength region S3 in the vehicle-body strength distribution between the area where the rear suspension member 21 is arranged and the area where the battery 31 is arranged. Hence, the stroke of the crush deformation at the rear of the vehicle body can be increased.

As a result, a proper deformation mode is obtained which allows maintenance of the shape of the part at the rear of the vehicle body where the high voltage component 30 is mounted, and allows crush deformation of the parts in front of and behind it by predetermined amounts. This makes it possible to protect the high voltage component 30 and ensure the required predetermined amount of collision energy absorption.

Also, in this embodiment, the strength of each arm section 25A of the cross member 25 of the rear suspension member 21 toward the front side of the vehicle is such that the strength of the entire arm section 25A from the portion of the arm section 25A linked to the side member 24 to the fastening portion 22 on the arm section 25A, which is fastened to the rear side member 11, is higher than the strength of the vehicle-width-direction middle section 25B.

In this way, upon a rear-end collision of the vehicle, deformation of the cross member 25 toward the front side of the vehicle can be suppressed mostly with the arm sections 25A. Hence, the plate thickness and/or closed-cross-sectional area of the vehicle-width-direction middle section 25B can be reduced, and the weight can be reduced accordingly.

Meanwhile, the points P to fix the high voltage component 30 to the rear suspension member 21 are the two fixing points P1, P2 to the rear sections of the pair of left and right side members 24 and the one fixing point P3 to the center of the vehicle on the vehicle-width-direction middle section 25B of the cross member 25 toward the front side of the vehicle, thereby providing a three-point securing structure with well-balanced support. Such a three-point securing structure can enhance the protection effect on the high voltage component 30 particularly in a rear-end offset collision as mentioned above by avoiding displacement of the fixing points P1 to P3 relative to each other and stably maintaining the fixed state of the high voltage component 30.

Figure 5:
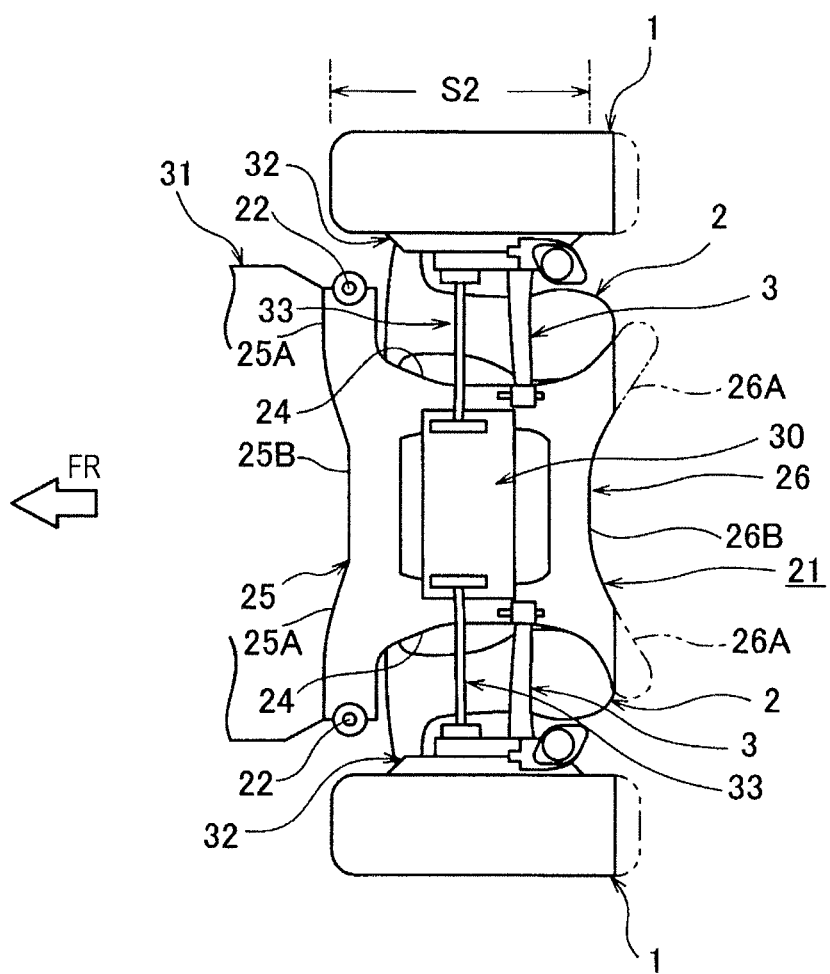
FIG. 5 is a plan view showing how the rear suspension member and the rear wheels are displaced upon a rear-end full overlap collision of the vehicle in the embodiment shown in FIG. 4.

Here, as shown in FIG. 5, the rear wheels 1 are supported on the side members 24 of the rear suspension member 21 by means of a plurality of suspension components such as lower arms 2 and upper arms 3. Then, the rear wheels 1, their suspension components 2, 3, and other relevant elements are also arranged in the high-strength region S2 in the vehicle-body strength distribution.

Figure 4:
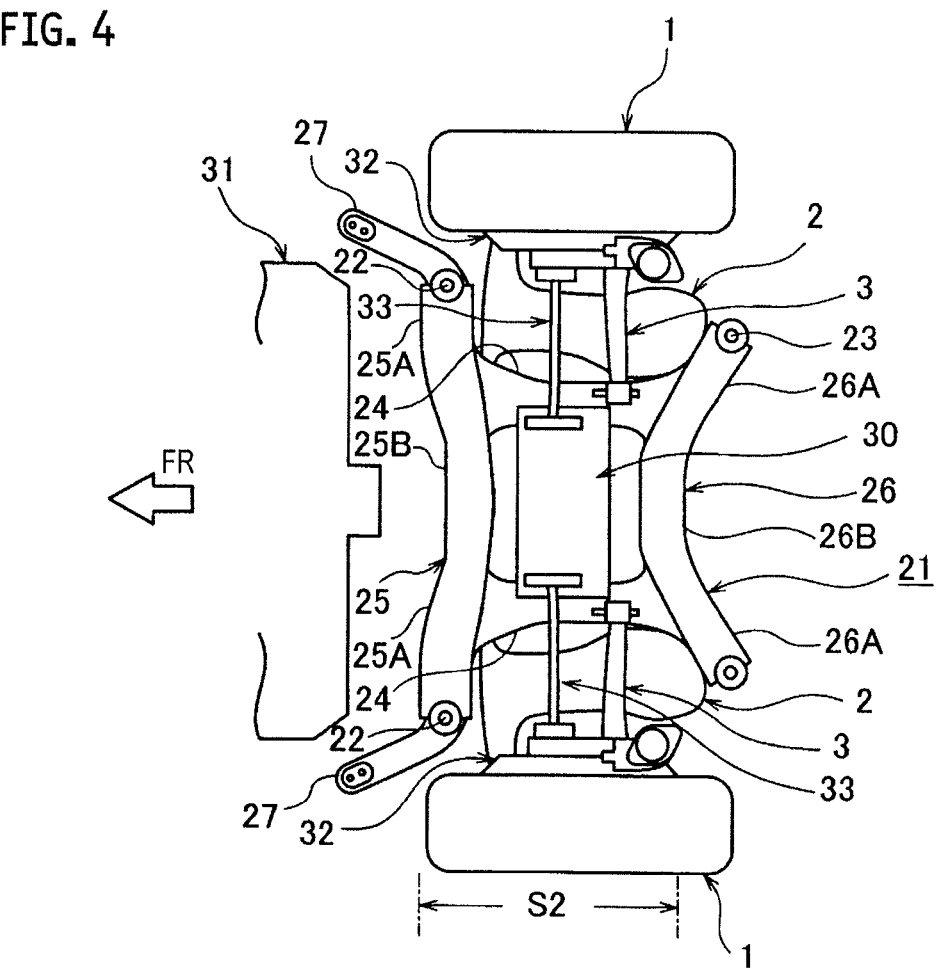
FIG. 4 is a plan view showing how the rear suspension member and rear wheels supported thereon are arranged in the embodiment shown in FIG. 1.

FIGS. 4 and 5 show an in-wheel motor vehicle with the traction motors 32 arranged in the rear wheels 1. A high voltage circuit is arranged in the high-strength region S2 in the vehicle-body strength distribution by connecting harnesses 33 to the high voltage component (e.g. inverter) 30 and the traction motors 32 through connectors.

Thus, upon for example a rear-end full overlap collision of the vehicle, the two low-strength regions S1, S3 in the vehicle-body strength distribution undergo crush deformation as shown in FIG. 5 from the state shown in FIG. 4, whereas the high-strength region S2 in the vehicle-body strength distribution is displaced toward the front side of the vehicle while maintaining the shape. In other words, the high voltage component 30, the traction motors 32, the harnesses 33, the rear wheels 1, their suspension components 2, 3, and other relevant elements move together toward the front side of the vehicle without displacement relative to each other.

As a result, in addition to the high voltage circuit, the rear suspensions can be properly protected. Hence, enhanced protection and safety can be achieved.

Meanwhile, there has been a demand on the rear vehicle body structures for automobiles that the length of rearward extension of each rear side member 11 should be shortened for the purpose of increasing the degree of freedom in vehicle body design. However, shortening this length of rearward extension reduces the amount of collision energy absorption by crush deformation in a rear-end collision of the vehicle.

Here, in this embodiment, as mentioned above, the low-strength region S3 is set in the vehicle-body strength distribution in front of the area where the rear suspension member 21 is arranged, in addition to the fact that the rear suspension member 21 can effectively function as an energy absorbing member. In this way, as mentioned above, crush deformation is caused to occur also at the region S3 for energy absorption. Hence, it is possible to fulfill the demand on the vehicle body design that the length of rearward extension of each rear side member 11 should be shortened, while also providing a sufficiently satisfactory measure against rear-end collision.

Although the content of the present invention has been described above along the embodiment, it is apparent to those skilled in the art that the present invention is not limited to the description, and various modifications and improvements can be made thereto.

The present invention can bring about remarkably advantageous effects when applied to a rear vehicle body structure as described above. However, the present invention can of course be applied to a front vehicle body structure. In this case, front side members and their peripheral members correspond to the "vehicle-body-side members," a front suspension member corresponds to the "suspension member," and the "end side of the vehicle body" represents the front end side of the vehicle body.

Also, the "high voltage component" mounted on the suspension member is not limited to the inverter mentioned above but may be a traction motor, a battery for feeding power to a traction motor, or the like.

The entire content of Japanese Patent Application No. 2013-233633 (filed on Nov. 12, 2013) is incorporated herein.

INDUSTRIAL APPLICABILITY

In the vehicle body structure for an automobile according to the present invention, in response to application of an input load to the end of the vehicle body (the front end of the vehicle body or the rear end of the vehicle body) upon a collision of the vehicle, the arm section(s) of the cross member of the suspension member on that end side of the vehicle body, which is(are) positioned in the low-strength region in the vehicle-body strength distribution on the end side of the vehicle body in the area where the suspension member is arranged, undergoes crush deformation together with the corresponding vehicle-body-side member(s).

This crush deformation of the suspension member is allowed only up to the base portion of the arm section(s) in its (their) extending direction, and deformation of the part of the suspension member other than the arm sections, which is positioned in the high-strength region in the vehicle-body strength distribution on the center side of the vehicle body, is suppressed.

Thus, the vehicle body structure for an automobile according to the present invention can protect the high voltage component and bring about an efficient collision-energy absorption effect, regardless of whether the collision of the vehicle is a full overlap collision or an offset collision.

REFERENCE SIGNS LIST 1 rear wheel (wheel)
2, 3 suspension component
11 rear side member (vehicle-body-side member)
12 rear-end cross member (vehicle-body-side member)
13 rear-seat cross member (vehicle-body-side member)
21 rear suspension member (suspension member)
22, 23 fastening portion
24 side member
25, 26 cross member
25A, 26A arm section
25B, 26B vehicle-width-direction middle section
30 high voltage component
31 battery (underfloor-mounted component)
33 harness
S1 low-strength region in vehicle-body strength distribution
S2 high-strength region in vehicle-body strength distribution
S3 low-strength region in vehicle-body strength distribution
P (P1 to P3) fixing point

The invention claimed is:

1. A vehicle body structure for an automobile comprising:
a suspension member arranged horizontally on a lower side of a front or a rear of a vehicle body and supporting a wheel, wherein
the suspension member is formed in a rectangular frame shape in a plan view by including a pair of left and right side members extending in a vehicle front-rear direction and a pair of front and rear cross members joining the pair of side members to each other,
at least the cross member on an end side of the vehicle body includes arm sections extending obliquely outward in a vehicle width direction toward the end side of the vehicle body from portions of the cross member on the end side of the vehicle body linked to the side members, and fastened at end portions thereof to vehicle-body-side members,
strength of the arm sections is set lower than strength of the remaining part of the suspension member, and a vehicle-body strength distribution in an area where the suspension member is arranged is set such that a low-strength region and a high-strength region sequentially appear from the end side of the vehicle body, and
a high voltage component is mounted on the suspension member on a center side of the vehicle body relative to a base portion of the arm section in an extending direction thereof and in the high-strength region in the vehicle-body strength distribution.

2. The vehicle body structure for an automobile according to claim 1, wherein
the cross member of the suspension member on the center side of the vehicle body includes arm sections extending outward in the vehicle width direction from portions of the cross member on the center side of the vehicle body linked to the side members, and fastened at end portions thereof to the vehicle-body-side members, and
each of the arm sections of the cross member on the center side of the vehicle body is such that strength of the entire arm section from the portion linked to the side member to a fastening portion at which the arm section is fastened to the vehicle-body-side member is higher than strength of a vehicle-width-direction middle portion of the cross member on the center side of the vehicle body.

3. The vehicle body structure for an automobile according to claim 1, wherein points to fix the high voltage component to the suspension member are three points including two fixing points to the pair of left and right side members and one fixing point to the vehicle-width-direction middle section of the cross member on the center side of the vehicle body.

4. The vehicle body structure for an automobile according to claim 1, wherein
strength of the side members of the suspension member and the cross member of the suspension member on the center side of the vehicle body is set higher than strength of the vehicle body at an intermediate area situated between the area where the suspension member is arranged and an area on the center side of the vehicle body where an underfloor-mounted component is arranged, and
a vehicle-body strength distribution from the area where the suspension member is arranged to the intermediate area is set such that the low-strength region, the high-strength region, and a low-strength region set as the intermediate area sequentially appear from the end side of the vehicle body.

5. The vehicle body structure for an automobile according to claim 1, wherein a wheel with a traction motor arranged therein is supported on the suspension member in the high-strength region in the vehicle-body strength distribution.

6. The vehicle body structure for an automobile according to claim 1, wherein the suspension member is a rear suspension member arranged at the rear of the vehicle body.

* * * * *